United States Patent [19]

Bose

[11] Patent Number: 4,484,117

[45] Date of Patent: Nov. 20, 1984

[54] MICROPROCESSOR-BASED CONTROL APPARATUS FOR A DIRECT CURRENT MACHINE DRIVE SYSTEM

[75] Inventor: Bimal K. Bose, Latham, N.Y.

[73] Assignee: General Electric Company, Schenectady, N.Y.

[21] Appl. No.: 334,119

[22] Filed: Dec. 24, 1981

Related U.S. Application Data

[63] Continuation of Ser. No. 124,346, Feb. 25, 1980, abandoned.

[51] Int. Cl.$^3$ .............................................. H02P 5/06
[52] U.S. Cl. .................... 318/338; 318/341; 318/723; 318/79; 318/493
[58] Field of Search ................ 318/338, 341, 723, 79, 318/493

[56] References Cited

U.S. PATENT DOCUMENTS

| | | | |
|---|---|---|---|
| 3,950,684 | 4/1976 | Peterson | 318/338 |
| 4,019,107 | 4/1977 | Dixon et al. | 318/338 |
| 4,037,144 | 7/1977 | Ohmae et al. | 318/338 |
| 4,247,807 | 1/1981 | Wilson | 318/338 |
| 4,276,505 | 6/1981 | Bose | 318/723 |

FOREIGN PATENT DOCUMENTS

| | | | |
|---|---|---|---|
| 1100775 | 3/1961 | Fed. Rep. of Germany | 318/338 |
| 1802108 | 6/1969 | Fed. Rep. of Germany | 318/338 |
| 1918584 | 10/1969 | Fed. Rep. of Germany | 318/338 |
| 663052 | 5/1979 | U.S.S.R. | 318/338 |

OTHER PUBLICATIONS

Jackson et al., "Direct Digital Control of Thyristor Convertors," IFAC, *Symposium on Control and Power Electronics and Electrical Drives*, 70-74, pp. 431-441.
Fallside et al., "Direct Digital Control of Thyristor Amplifiers" Proc. IEE, vol. 116, No. 5, May 60, pp. 873-878.

*Primary Examiner*—Ulysses Weldon
*Attorney, Agent, or Firm*—Mark L. Mollon; James C. Davis, Jr.; Marvin Snyder

[57] ABSTRACT

A microcomputer for use with a direct current machine drive system processes machine drive system currents and voltages to compute real time machine efficiency. From real time machine efficiency, the microcomputer determines optimum, that is to say, desired machine armature current and optimum machine air gap flux. Machine armature current and field current are regulated, respectively, by controlling machine armature voltage responsive to the difference in magnitude between optimum armature current and actual armature current, and by controlling machine field voltage responsive to the difference in magnitude between optimum machine air gap flux and actual machine armature flux, respectively, to assure machine operation at maximum efficiency irrespective of machine load conditions.

4 Claims, 6 Drawing Figures

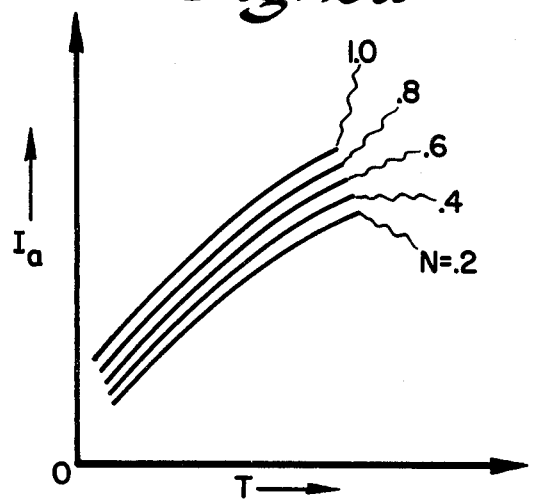
Fig. 2a
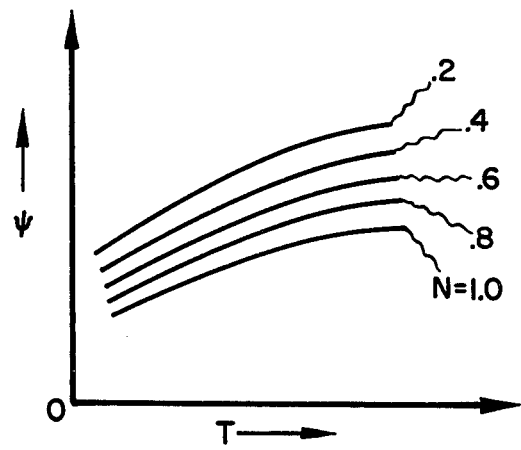
Fig. 2b
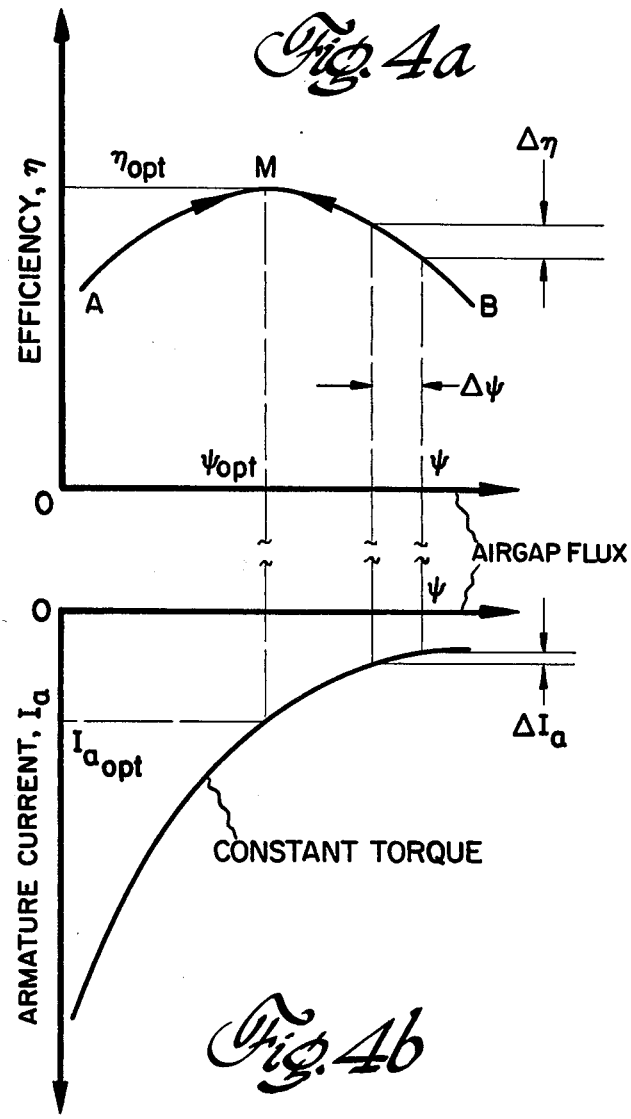
Fig. 4a
Fig. 4b

MICROPROCESSOR-BASED CONTROL APPARATUS FOR A DIRECT CURRENT MACHINE DRIVE SYSTEM

This application is a continuation of application Ser. No. 124,346, filed Feb. 25, 1980, now abandoned.

BACKGROUND OF THE INVENTION

This invention relates generally to direct current machines, and, more specifically, to a control apparatus for regulating machine armature current and field current in accordance with machine efficiency computed in real time to obtain maximum machine efficiency irrespective of machine load conditions.

Direct current machine drive systems are commonly employed in various industrial applications requiring adjustable machine speed. Typically, a direct current machine drive system comprises a direct current machine and a pair of adjustable direct current power supplies, one for supplying machine armature current, the other for supplying machine field current. Usually each of the pair of adjustable direct current power supplies comprises either a phase controlled rectifier circuit or a chopper circuit whose output voltage can be varied by varying phase controlled rectifier or chopper circuit conduction, respectively, thereby permitting machine armature current and machine field current to be adjusted accordingly.

Heretofore, control apparatus employed to regulate machine drive system armature current and field current operated to obtain maximum machine efficiency by varying armature current in accordance with a predetermined relationship between armature current and machine air gap flux. Such operation is premised on the assumptions that: (1) machine torque is uniquely related to machine speed; (2) machine armature and field resistances are constant and independent of temperature; and (3) machine voltages and currents contain no harmonics. Regretably, such ideal conditions hardly ever exist during operation of a conventional direct current machine drive system and therefore, optimum machine efficiency is virtually never obtained by use of such prior art control apparatus.

In contrast, the control apparatus of the present invention obtains optimum machine efficiency by regulating machine armature current and machine field current responsive to optimum machine armature current and optimum machine air gap flux, respectively, which are determined in accordance with machine efficiency computed in real time.

BRIEF SUMMARY OF THE INVENTION

Briefly, in accordance with the preferred embodiment of the invention, a control apparatus for regulating the armature and field currents supplied to a direct current machine to obtain optimum machine efficiency irrespective of machine load conditions comprises a signal processing circuit coupled to the direct current machine and responsive to machine armature current and voltage and field current and voltage. The signal processing circuit, typically implemented as a microcomputer, processes machine armature current and voltage and field current and voltage and, in accordance with the magnitudes thereof, computes machine efficiency in real time. In accordance with machine efficiency, the signal processing circuit produces a pair of output signals, the first varying in accordance with optimum armature current, and the second varying in accordance with optimum machine air gap flux. The first signal processor output signal is supplied to a first control loop which controls the magnitude of armature current by varying machine armature voltage responsive to the difference in magnitude between optimum and actual armature current. A second control loop is supplied with the second signal processor output signal and regulates machine field current by adjusting machine field voltage responsive the difference in magnitude between optimum machine air gap flux and actual air gap flux. Regulation of machine armature and field current in accordance with real time machine efficiency in the manner described above results in optimum machine efficiency irrespective of machine load conditions.

It is an object of the present invention to provide a microcomputer-based control apparatus for a direct current machine drive system.

It is another object of the present invention to provide a microcomputer based control apparatus for regulating the armature and field current of a direct current machine drive system by feedback control responsive to optimum armature current and optimum machine air gap flux, respectively, which are determined in accordance with real time machine efficiency.

BRIEF DESCRIPTION OF THE DRAWINGS

The features of the invention believed to be novel are set forth with particularity in the appended claims. The invention itself, both as to organization and method of operation, together with further objects and advantages thereof, may best be understood by reference to the following description taken in conjunction with the accompanying drawings in which:

FIG. 2a is a graphical illustration of the relationship between optimum armature current and load torque for each of several values of machine speed;

FIG. 2b is a graphical illustration of the relationship between optimum machine air gap flux and load torque for each of several values of machine speed;

FIG. 4a is a graphic illustration of the relationship between machine efficiency and air gap flux; and FIG. 4b is a graphical illustration of the relationship between armature current and machine air gap flux at constant load torque and speed.

DETAILED DESCRIPTION OF THE PREFERRED EMBODIMENT

Figure 1:
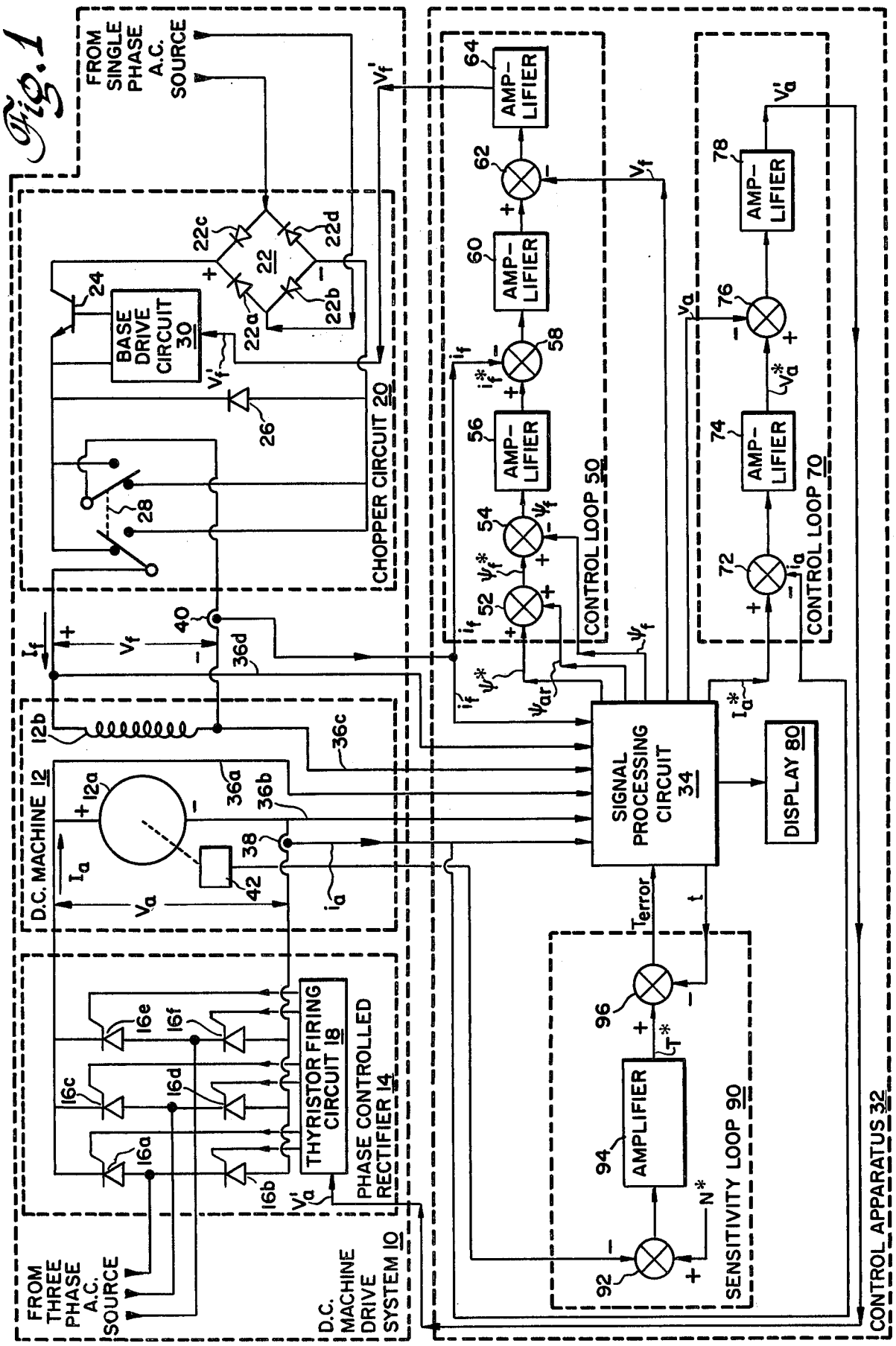
FIG. 1 is a part schematic, part block diagram of a direct current machine drive system including the control apparatus of the present invention.

FIG. 1 illustrates a drive system 10 including a direct current machine 12. Machine 12 is represented schematically as having an armature 12a and a field 12b. Armature 12a is supplied from a first variable amplitude direct current voltage source 14 with an armature voltage $V_a$. In the presently preferred embodiment, direct current voltage source 14 is configured of a phase controlled rectifier comprising three pairs of thyristors 16a and 16b, 16c and 16d and 16e and 16f, respectively, the thyristors of each pair being coupled in series aiding fashion and each of the pairs of thyristors being coupled in parallel across the positive and negative terminals of armature 12a. The junction between thyristors of each pair is coupled to one of the three phases, respectively, of three phase alternating current source (not shown). Thyristors 16a, 16b, 16c, 16d, 16e and 16f are rendered conductive in a predetermined sequence responsive to firing signals supplied to the gate of each thyristor by a thyristor firing circuit 18 in accordance with an armature voltage control signal $v_a'$, supplied by a control apparatus (described more fully below).

Various inverter thyristor firing circuits exist and are well known in the art. Therefore, the details of inverter thyristor firing circuit 18 are not shown. For a further, more detailed description of inverter thyristor firing circuits reference should be had to the *General Electric Silicon Controlled Rectifier Handbook* (5th Edition), published by Semiconductor Products Department of General Electric Company, Syracuse, N.Y. (1972).

Field 12b of machine 12 is supplied from a second variable amplitude direct current voltage source 20 with a field voltage $V_f$. Preferably, direct current voltage source 20 comprises a chopper circuit including a full wave rectifier bridge 22 formed of two pairs of rectifiers 22a and 22b, and 22c and 22d, respectively, the rectifiers of each pair coupled in series aiding fashion and the pairs of rectifiers coupled in parallel. When alternating current from a commercial alternating current source, such as a 60 Hz. single phase alternating current supply (not shown) is supplied to the junctions between rectifiers 22a and 22b and 22c and 22d, a direct current voltage appears across rectifier pairs 22a and 22b, and 22c and 22d. A high current transistor 24, typically an NPN type transistor, and a diode 26 are coupled in series-opposition across rectifier pairs 22a and 22b, and 22c and 22d. Field 12b is coupled by a contactor 28 across the anode and cathode of diode 26. When transistor 24 is periodically rendered conductive by a base drive circuit 30, coupled to the transistor base and emitter, in accordance with a field voltage control signal $v_f'$ supplied by the control apparatus, a direct current voltage appears across diode 26, causing field 12b to be excited. By varying the conduction of transistor 24, the field excitation can be varied accordingly. Reversal of machine rotation is accomplished by reversing contactor 28 to reverse the polarity of field voltage $V_f$.

To assure maximum machine drive system efficiency irrespective of machine load and speed conditions, machine drive system 10 armature and field currents are regulated in accordance with real time efficiency by a control apparatus 32. Control apparatus 32 comprises a signal processing circuit 34, typically a Model 8086 microcomputer such as manufactured by Intel Corp. Microcomputer 34 is supplied from armature 12a via conductors 36a and 36b with armature voltage $V_a$, and from field 12b via conductors 36c and 36d with field voltage $V_f$. Microcomputer 34 is also supplied from a current sensor 38, coupled in series with armature 12a and phase controlled rectifier 14, with a signal $i_a$, varying in accordance with armature current $I_a$, and is further supplied from a current sensor 40, coupled in series with field 12b and chopper circuit 20, with a signal $i_f$ varying in accordance with field current $I_f$. Microcomputer 34 processes signals $i_a$ and $i_f$ together with voltages $V_a$ and $V_f$ and the output voltage produced by a tachogenerator 42, coupled to the shaft of machine 12, to produce a first signal $\Psi^*$ varying in accordance with optimum air gap flux $\Psi_{opt}$, being that magnitude of flux required for maximum machine efficiency, and to produce a second signal $I_a^*$ varying in accordance with optimum armature current $I_{aopt}$, which is that magnitude of armature current required for optimum machine efficiency.

In order to better understand how signals $\Psi^*$ and $I_a^*$ are obtained from machine drive system parameters, a brief review of the relationship between direct current machine drive system 10 parameters and machine losses, and the relationship between machine losses and machine efficiency will be presented. The machine losses $P_a$, attributable to armature 12a resistance, are given by the expression:

$$P_a = I_a^2 R_a \tag{1}$$

where $R_a$ is the armature resistance. The losses $P_f$, attributable to field 12b are given by the equation:

$$P_f = V_f I_f. \tag{2}$$

Direct current machine losses $P_e$, attributable to machine iron are given by the relationship:

$$P_e = k_1 \Psi^2 N^2 + k_2 \Psi^{1.6} N \tag{3}$$

where $k_1$ and $k_2$ are constants, $\Psi$ is machine air gap flux and N is the direct current machine speed. The losses $P_s$ attributable to machine friction and windage, are given by the expression:

$$P_s = k_3 N^3 + k_4 N^2. \tag{4}$$

Machine efficiency, $\eta$, defined as the ratio of machine output power to machine input power, can be expressed as $$\eta = 1 - \frac{(P_a + P_f + P_e + P_s)}{V_f I_f + V_a I_a} \tag{5}$$

At steady state conditions, that is, when machine parameters are relatively constant and few harmonics are present in machine current and voltage, $\eta$ can be expressed as a function of machine parameters N; $I_a$, $\Psi$ and T, T being the machine load torque, as evidenced by the equation (6).

$$\eta = f(N, I_a, \Psi, T). \tag{6}$$

Once values for the machine speed N and the load torque T, are obtained, optimal values for machine armature current $I_{a\ opt}$ and machine air gap flux, $\Psi_{opt}$, respectively, can be computed from equation (6) by setting $\delta\eta/\delta I_a$ and $\delta\eta/\delta\Psi$, respectively, equal to zero. The relationship between per unit optimum armature current and per unit load torque for each of several per unit values of machine speed illustrated in FIG. 2a and the relationship between optimum air gap flux and load torque for each of several values of per unit machine speed illustrated in FIG. 2b.

One possible approach for determining $I_{a\ opt}$ and $\Psi_{opt}$ is to generate two sets of look-up tables, the first set containing tables of optimum armature current and corresponding torque values, the second set containing tables of optimum machine air gap flux and corresponding torque values, with each table of optimum armature current values, and each table of optimum air gap flux values corresponding to a particular machine speed. These sets of tables are then stored in the memory of microcomputer 34 of FIG. 1. Once the magnitudes of load torque and speed have been determined, optimal values for machine armature current and machine air gap flux are obtained from one of the first and second set of tables, respectively, stored in the microcomputer memory and signals $I_a^*$ and $\Psi^*$, respectively, are generated accordingly by a digital to analog converter in the microcomputer.

Figure 3:
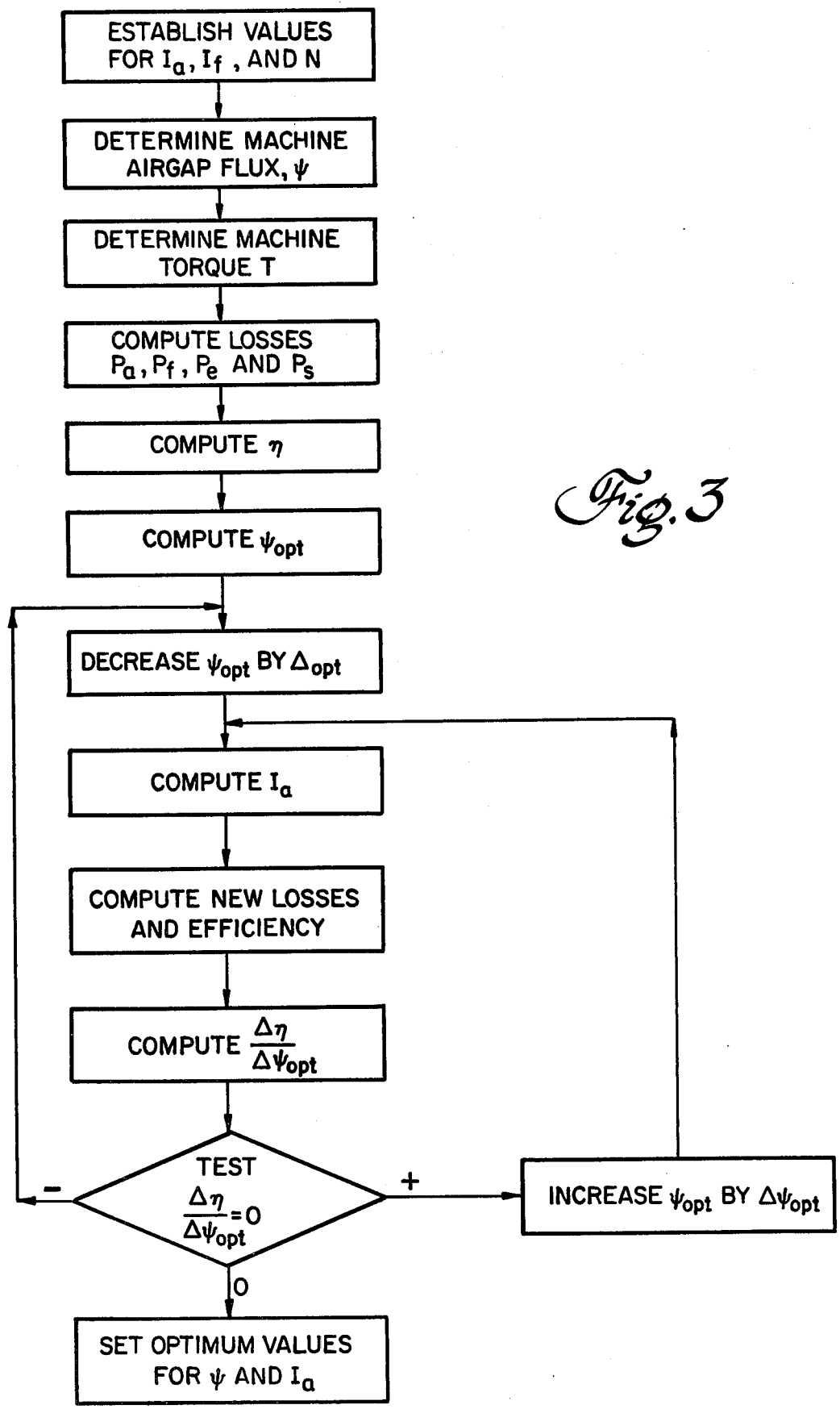
FIG. 3 is a flow chart of the program executed by the control apparatus of FIG. 1 to determine optimum machine armature current and optimum machine air gap flux.

In the presently prefered embodiment, optimum armature current $I_{a\,opt}$ and machine air gap flux $\Psi_{opt}$ values are determined by microcomputer 34 in accordance with real time machine efficiency as computed during execution of the program illustrated in flow chart form in FIG. 3. Referring now to both FIGS. 1 and 3, values for $I_a$ and $I_f$ and are initially established in accordance with the output signal magnitude of current sensors 38 and 42, respectively, (shown in FIG. 1) and the value for N is established in accordance with the output voltage magnitude of tachogenerator 42 shown in FIG. 1. After values for $I_a$, N and $I_f$ are established, machine air gap flux is determined. To avoid the necessity of configuring machine 12 of FIG. 1 with flux coils, microcomputer 34 of FIG. 1 determines machine air gap flux $\Psi$ from machine speed N, machine armature voltage $V_a$, machine armature current $I_a$ and machine armature resistance $R_a$ in accordance with the expression:

$$\Psi = \int (V_a - I_a R_a)/(k_4 N) \qquad (7)$$

where $k_4$ is a constant. The value of air gap flux obtained from equation (7) may vary from the true value of machine air gap flux because of the phenomenon that machine armature resistance is not constant, but rather, varies in accordance with machine temperature $T_a$ as evidenced by the equation.

$$R_a = f(T_a) \qquad (8)$$

However, by sensing machine temperature with a thermistor (not shown) and inserting the appropriate value for $R_a$ obtained from equation (8) into equation (7), a highly accurate value of machine air gap flux can be obtained.

Following the determination of machine air gap flux, machine torque T is determined in accordance with the equation:

$$T = k_5 \Psi I_a \qquad (9)$$

where $k_5$ is a constant. Next, machine losses $P_a$, $P_f$, $P_e$ and $P_s$ are each computed in accordance with equations (1)-(4), respectively. Machine efficiency is then computed in accordance with equation (5). Thereafter, $\Psi_{opt}$ is computed in accordance with equation (6) by setting $\delta\eta/\delta\Psi = 0$.

To determine whether the computed optimum air gap flux value $\Psi_{opt}$ equals the true optimum value of machine air gap flux, the previously computed value of $\Psi_{opt}$ is decremented by the amount $\Delta\Psi_{opt}$, where $\Delta$ equals 0.0001 or less, to yield a new optimum air gap flux value. Next, a value for machine armature current $I_a$ is computed from equation (9) in accordance with the newly computed optimum air gap flux value and the previously established value of machine torque. Machine losses $P_a$, $P_f$, $P_e$ and $P_s$ and machine efficiency are then recomputed with the newly computed value of $I_a$. Thereafter, the difference $\Delta\eta$ between the previously computed and the newly computed value of machine efficiency is determined and the ratio $\Delta\eta/\Delta\Psi_{opt}$ is computed. Should the ratio $\Delta\eta/\Delta\Psi_{opt}$ be less than zero, indicating that the newly computed value of $\Psi_{opt}$ is greater than the true value of optimum air gap flux, then the following steps are executed:

(a) decrement $\Psi_{opt}$ by $\Delta\Psi_{opt}$;
(b) recompute $I_a$ in accordance with the newly computed value of $\Psi_{opt}$ and the previously determined value of machine torque;
(c) recompute the magnitude ratio $\Delta\eta/\Delta\Psi_{opt}$.

If the ratio $\Delta\eta/\Delta\Psi_{opt}$ remains less than zero, then steps (a)-(d) are re-executed.

Depending on the originally computed value of $\Psi_{opt}$, it may be possible that after initially executing steps (a)-(d), the ratio $\Delta\eta/\Delta\Psi_{opt}$ is greater than zero, indicating that the originally computed value of $\Psi_{opt}$ was smaller than the true value of maximum air gap flux. Should this be the case, then the originally computed value of $\Psi_{opt}$ is incremented by $\Delta\Psi_{opt}$ and steps (b)-(d) are re-executed.

Eventually, after repeated incrementing or decrementing of $\Psi_{opt}$ as described, the ratio $\Delta\eta/\Delta\Psi_{opt}$ becomes zero, indicating that the final value of $\Psi_{opt}$ now equals the true value of optimum air gap flux. Having now determined true optimum air gap flux, microcomputer 34 of FIG. 1 then computes true optimum armature current $I_{a\,opt}$ in accordance with equation (9). After $\Psi_{opt}$ and $I_{a\,opt}$ have been determined, a digital to analog converter within the microcomputer generates signals $\Psi^*$ and $I_a^*$ in accordance with $\Psi_{opt}$ and $I_{a\,opt}$, respectively.

The above-described method for computing optimum air gap flux and armature current values is referred to as the sensitivity method of on-line optimization and may be better understood by reference to FIGS. 4a and 4b. Referring to FIG. 4a which illustrates the relationship between machine efficiency and machine air gap flux, it can be observed that when machine air gap flux is less than the magnitude of machine air gap flux at maximum machine efficiency (point M on the curve), the slope $(\Delta\eta/\Delta\Psi)$ of the curve is greater than zero. Conversely, when machine air gap flux is greater than the optimum machine air gap flux magnitude, the slope of the efficiency vs. air gap flux curve is negative. By selecting an air gap flux value on the curve and adjusting its magnitude upwards or downward so that $\Delta\eta/\Delta\Psi = 0$, optimum air gap flux can readily be determined.

During steady state machine conditions, when machine speed N and load torque T are constant, optimum armature current from optimum air gap flux is determined in accordance with the relationship between $I_a$ and $\psi$ expressed in equation (9) and illustrated graphically in FIG. 4b. It will be readily apparent to those skilled in the art that optimum machine armature current could just as easily be computed first in accordance with the sensitivity method of on-line optimization and that optimum machine air gap flux would thereafter be determined from equation (9).

In addition to signals $\Psi^*$ and $I_a^*$, microcomputer 34 of FIG. 1 also generates signals $v_a$, $v_f$ and $\psi_{ar}$ and $\psi_f$. Signals $v_a$ and $v_f$ are generated in accordance with machine armature and field voltages $V_a$ and $V_f$, respectively, as supplied to microcomputer 34 of FIG. 1 via conductor pairs 36a and 36b and 36c and 36d, respectively. The signal $\psi_f$ varies directly with machine field flux $\Psi_f$. As machine field flux varies with machine field current $I_f$, signal $\Psi_f$ can be generated from signal $i_f$ produced by current sensor 40. The signal $\psi_{ar}$ varies directly with machine armature reaction $\Psi_{ar}$. Machine armature reaction is typically a small percentage of machine armature flux $\Psi_a$ as evidenced by the relationship $$\Psi_{ar} = k\Psi_a \qquad (10)$$

where k is typically 0.05 or less. Since machine armature flux varies with machine armature current $I_a$, signal $\psi_{ar}$ can be generated from the output signal produced by current sensor 38. By combining signals $\psi_{ar}$ and $\Psi^*$, which vary directly with machine armature reaction and optimum machine air gap flux, respectively, a field flux command signal proportional to desired machine field flux can be produced.

Referring again to FIG. 1, signals $\Psi^*$, $\psi_{ar}$, $\psi_f$ and $v_f$, produced by microcomputer 34, are supplied to a first control loop 50 coupled at its output to base drive circuit 30 of chopper circuit 20. Control loop 50 regulates the time ratio of transistor 24 conduction, and hence the machine field voltage magnitude, responsive to the difference in magnitude between optimum machine air gap flux and actual machine air gap flux and comprises a first summing amplifier 52 supplied at the first and second noninvert inputs from microcomputer 34 with signals $\Psi^*$ and $k\psi_{ar}$, respectively. In accordance with sum of the magnitude of signals supplied to the invert and noninvert summing amplifier inputs, summing amplifier 52 produces the field flux command signal $\Psi_f^*$ which is supplied to the noninvert input of a second summing amplifier 54. Summing amplifier 54 is supplied at the invert input from microcomputer 34 with the signal $\Psi_f$, and in accordance with the difference in magnitude between signals supplied to its noninvert and invert inputs, summing amplifier 54 produces an output signal, representing the flux error field, which is supplied to a amplifier 56 configured with relatively high gain. Amplifier 56 produces a field current command signal $i_f^*$ varying in accordance with the output signal produced by summing amplifier 54.

The field current signal $i_f^*$ produced by amplifier 56 is supplied to the noninvert input of a third summing amplifier 58. Summing amplifier 58 is supplied at the invert input from current sensor 40 with the signal $i_f$ varying in accordance with machine field current $I_f$, and in accordance with the difference in magnitude between signals supplied to the noninvert and invert inputs, summing amplifier 58 supplies an output signal representing armature current error to the input of an amplifier 60. Amplifier 60 is configured identically to amplifier 56, and in accordance with the output signal supplied thereto by summing amplifier 58, amplifier 60 supplies a field voltage command signal $v_f^*$ to the noninvert input of a fourth summing amplifier 62. Summing amplifier 62 is supplied at its invert input from microcomputer 34 with the signal $v_f$, varying in accordance with the machine field voltage $V_f$. In accordance with the difference in magnitude between signals supplied to its invert and noninvert inputs, summing amplifier 62 supplies an output signal, representing armature voltage error, to the input of an amplifier 64, configured identically to amplifier 56, which supplies the field voltage control signal $v_f^*$ to base drive circuit 30 in accordance with the output signal of summing amplifier 62. Base drive circuit 30 is thus responsive to the field voltage control signal $v_f^*$ and varies the time ratio of transistor 24 conduction, and hence machine field voltage, accordingly. Configured as described above control loop 50 advantageously regulates field current by feedback control responsive to optimum air gap flux (as determined from machine efficiency) to assure optimum field current at all times irrespective of machine load conditions.

A second control loop 70, coupled to thyristor firing circuit 18, is supplied from microcomputer 34 with signals $I_a^*$ and $v_a$, and in response to the difference between optimum and actual armture current, control loop 70 varies the amplitude of machine 12 armature current. Control loop 70 comprises a first summing amplifier 72 which is supplied at its noninvert input from microcomputer 34 with the signal $I_a^*$ varying in accordance with optimum armature current. Summing amplifier 72 is supplied at its invert input from current sensor 38 with the signal $i_a$ varying in accordance with armature current $I_a$. In accordance with the difference in magnitude between signals supplied to its invert and noninvert inputs, summing amplifier 72 supplies an output signal, representing the armature current error to the input of an amplifier 74. Amplifier 74 produces an armature voltage command signal $v_a^*$, varying in accordance with the output signal of summing amplifier 72, which is supplied to the noninvert input of a second summing amplifier 76. Summing amplifier 76 is supplied at invert input from microcomputer 34 with the signal $v_a$ varying in accordance with actual armature voltage $V_a$, and in accordance with the difference in magnitude between signals supplied to its invert and noninvert inputs, summing amplifier 76 supplies an output signal, representing armature voltage error, to the input of an amplifier 78. Summing amplifier 78 supplies thyristor firing circuit 18 of phase controlled rectifier 14 with the armature voltage control signal $v_a'$ in accordance with the output signal magnitude of summing amplifier 76. Thyristor firing circuit 18 varies the conduction of thyristors 16a–16f in accordance with armature voltage control signal $v_a'$. Configured in this manner, control loop 70 advantageously regulates armature current by feedback control in accordance with optimum machine armature current (which is determined from machine efficiency) to assure optimum machine armature voltage. Operating in concert, control loops 50 and 70 assure machine operation at maximum efficiency irrespective of machine load conditions.

Machine efficiency may be visually displayed with the addition of a display apparatus 80, shown in FIG. 1, coupled to microcomputer 34. By suitably modifying the program illustrated in flow chart form in FIG. 3 to include the step of displaying machine efficiency after computation of machine efficiency, a visual indication of machine efficiency is provided by display apparatus 80 of FIG. 1.

Regulation of machine 12 armature and field voltage by control apparatus 32 of FIG. 1, although advantageous during intervals of steady-state machine conditions, is not desirable during intervals of transient machine conditions because during these intervals machine parameters change too quickly to permit accurate computation of machine efficiency. Therefore, operation of microcomputer 34 is inhibited during transient machine conditions by a sensitivity loop 90. Sensitivity loop 90 comprises a first summing amplifier 92 coupled at its noninvert input to the output of tachogenerator 42 and supplied at its invert input from an external control circuit (not shown) with a signal $N^*$ varying in accordance with desired machine speed. In accordance with the difference in magnitude between signals supplied to its noninvert and invert inputs, summing amplifier 92 supplies a speed error signal to the input of an amplifier 94 configured with relatively high gain. Amplifier 94 supplies a torque command signal T*, varying in accordance with the output signal produced by summing amplifier 92, to the noninvert input of a second summing amplifier 96. Summing amplifier 96 is supplied at its invert input from microcomputer 34 with the signal t, varying in accordance with machine 12 load torque T, and in accordance with the difference in magnitude between signals supplied to its noninvert and invert inputs, summing amplifier 96 supplies microcomputer 34 with a torque error signal $T_{error}$. During intervals of transient machine conditions, when the torque error signal $T_{error}$ exceeds a predetermined magnitude, microcomputer 34 in response thereto temporarily ceases operation, thereby preventing machine 12 armature and field current from being regulated in accordance with machine efficiency during such intervals.

The foregoing describes a microcomputer-based control apparatus for a direct current machine drive system. The microcomputer based control apparatus accomplishes real time computation of machine efficiency and adjusts machine armature and machine field current by feedback control responsive to optimum machine armature current and optimum machine air gap flux, respectively, which are determined by the microcomputer in accordance with machine efficiency.

While the invention has been particularly shown and described with reference to several preferred embodiments thereof, it will be understood by those skilled in the art that various changes in form and detail may be made therein without departing from the true spirit and scope of the invention as defined by the appended claims.

What is claimed is:

1. A method of controlling a DC machine drive supplied with power from an external source during steady state operation using a microcomputer having stored machine constants, the machine drive having an armature current control loop and an air gap flux control loop, said method comprising the steps of:
   (1) measuring armature and field voltages and currents, and machine speed;
   (2) determining air gap flux from measured field current and one of said stored machine constants;
   (3) determining machine torque from air gap flux, armature current and another of said stored machine constants;
   (4) determining machine ohmic losses from measured field voltage, field current and armature current and selected ones of said machine constants;
   (5) determining machine efficiency from machine losses and power input to the machine;
   (6) processing machine efficiency as a function of air gap flux to determine whether air gap flux should be increased or decreased to increase machine efficiency;
   (7) varying air gap flux by a predetermined amount in accordance with the output of said air gap flux control loop;
   (8) varying armature current in accordance with the output of said armature current control loop so that the previously determined torque is maintained;
   (9) commanding the new values of armature current and air gap flux in said armature current control loop and air gap flux control loop, respectively; and
   (10) repeating steps 1–10.

2. The method of claim 1 wherein said step of determining machine ohmic losses comprises determining machine iron losses, field losses and armature losses.

3. A method of controlling a DC machine drive supplied with power from an external source during steady state operation, using a microcomputer having stored machine constants, the machine drive having an armature current control loop and an air gap flux control loop, said method comprising the steps of:
   (1) measuring armature and field voltages and currents, and machine speed;
   (2) determining air gap flux from measured field current and one of said stored machine constants;
   (3) determining machine torque from air gap flux, armature current and another of said stored machine constants;
   (4) determining machine ohmic losses from measured field voltage, field current and armature current and selected ones of said machine constants;
   (5) determining machine efficiency from machine losses and power input to the machine;
   (6) processing machine efficiency as a function of armature current to determine whether armature current should be increased or decreased to increase machine efficiency;
   (7) varying armature current by a predetermined amount in accordance with the output of said armature current control loop;
   (8) varying air gap flux in accordance with the output of said air gap flux control loop so that the previously determined torque is maintained;
   (9) commanding the new value of armature and air gap flux in said armature current control loop and air gap flux control loop, respectively;
   (10) repeating steps 1–10.

4. The method of claim 3 wherein said step of determining machine ohmic losses comprises determining machine iron losses, field losses and armature losses.

* * * * *